(12) United States Patent
Ukai et al.

(10) Patent No.: US 6,562,088 B2
(45) Date of Patent: *May 13, 2003

(54) METHOD FOR OPERATING A HYDROGEN GENERATING APPARATUS

(75) Inventors: Kunihiro Ukai, Ikoma (JP); Kimiyasu Honda, Kusatsu (JP); Kiyoshi Taguchi, Osaka (JP); Takeshi Tomizawa, Ikoma (JP); Kouichiro Kitagawa, Fujisawa (JP); Toshiyuki Shono, Soraku-gun (JP)

(73) Assignee: Matsushita Electric Industrial Co., Ltd., Osaka-fu (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/392,691

(22) Filed: Sep. 9, 1999

(65) Prior Publication Data

US 2001/0002248 A1 May 31, 2001

(30) Foreign Application Priority Data

| Sep. 9, 1998 | (JP) | 10-255001 |
| Oct. 9, 1998 | (JP) | 10-287649 |
| Apr. 5, 1999 | (JP) | 11-098092 |
| Apr. 21, 1999 | (JP) | 11-113879 |

(51) Int. Cl.⁷ ................................. C01B 3/00
(52) U.S. Cl. .............. 48/197 R; 48/127.9; 48/198.3; 422/190; 422/198; 422/211
(58) Field of Search ............... 204/225–235; 422/170–190, 198, 202, 211; 423/600–700, 246, 437 M; 429/13–21; 48/61, 127.9, 197 R, 198.3, 198.7, 204

(56) References Cited

U.S. PATENT DOCUMENTS 5,110,559 A * 5/1992 Kondo et al. ............... 422/109
5,658,681 A    8/1997 Sato et al.
5,690,797 A * 11/1997 Harada et al. ............... 204/229
5,897,970 A *  4/1999 Isomura et al. .............. 429/9
5,904,913 A *  5/1999 Bohm et al. ............... 423/648.1

FOREIGN PATENT DOCUMENTS

| DE | 197 19 997 A 1 | 5/1998 |
| JP | 05326008 A | 12/1993 |
| JP | 06215785 A | 8/1994 |
| JP | 06290801 A | 10/1994 |
| JP | 09092319 A | 4/1997 |

OTHER PUBLICATIONS

English translation of German patent DE 197 19 997 A1, Autenrieth et al., May, 1998.*

Machine–aided English translation of unexamined Japanese patent No. 06–290801A, Munehiko et al., Oct. 1994.*

* cited by examiner

Primary Examiner—Jerry D. Johnson
Assistant Examiner—Basia Ridley
(74) Attorney, Agent, or Firm—Akin Gump Strauss Hauer & Feld, L.L.P.

(57) ABSTRACT

A hydrogen generating apparatus comprising a reformer, a heating section, a fuel supply section, a water supply section, a shift reactor with a shift catalyst layer, a first heat exchanger on the downstream side of the shift catalyst layer, and a temperature detector for the shift catalyst layer. The temperature of the downstream portion of the shift catalyst layer is raised by the action of the heat exchanger compared with the temperature of the same before the amount of the reformed gas is increased. And, the temperature of the downstream portion is lowered compared with the temperature of the same before the amount of the reformed gas is reduced when reducing the amount of the reformed gas. Accordingly, regardless whether the generation amount of hydrogen is large or small, the hydrogen generating apparatus can supply a constant concentration hydrogen gas while keeping the concentration of byproduct carbon monoxide low.

6 Claims, 8 Drawing Sheets

POSITION ALONG THE LONGITUDINAL DIRECTION IN SHIFT CATALYST LAYER

METHOD FOR OPERATING A HYDROGEN GENERATING APPARATUS

BACKGROUND OF THE INVENTION

The present invention relates to a hydrogen generating apparatus for producing hydrogen, which is supplied to a fuel cell or the like.

A fuel cell for electricity generation used in a residential cogeneration system or mounted in an electric vehicle generates electricity by causing hydrogen gas to react with air. Hydrogen supplied to such a fuel cell is generated by a steam reforming method or a partial oxidation method, using as feedstock hydrocarbons such as LPG, naphtha, gasoline, kerosene, alcohol, coal or the like, or natural gas composed principally of methane.

Of these methods, the steam reforming method consists mainly of a reforming process and a shifting process. The steam reforming reaction results in the production of carbon monoxide as well as hydrogen and carbon dioxide. In fuel cells such as molten carbonate fuel cells operating at high temperatures, carbon monoxide generated as a byproduct by steam reforming can also be used as a fuel. However, in the case of phosphoric acid fuel cells and solid polymer fuel cells, which operate at low temperatures, the platinum-based catalyst used as an electrode is poisoned by the carbon monoxide and sufficient electricity performance cannot be obtained. In view of this fact, in Japanese Laid-Open Patent Publications Sho 62-27489 or Hei 3-276577, it is proposed to provide a hydrogen generating apparatus used for a fuel cell operating at low temperatures with a shift catalyst reactor or a purifying catalyst reactor. This shift catalyst reactor causes the carbon monoxide contained in the reformed gas to react with water. And, the purifying catalyst reactor selectively oxidizes the carbon monoxide.

Here, a brief description will be given of the steam reforming method by taking an example in which methane is used as the feedstock. The reaction equations for steam reforming reaction are given as (Equation 1) and (Equation 2), which represent the reforming reactions as the primary reactions, and as (Equation 3), which represents the shift reaction as the secondary reaction.

$$CH_4 + H_2O \leftrightarrow CO + 3H_2 \qquad \text{(Equation 1)}$$

$$CH_4 + 2H_2O \leftrightarrow CO_2 + 4H_2 \qquad \text{(Equation 2)}$$

$$CO + H_2O \leftrightarrow CO_2 + H_2 \qquad \text{(Equation 3)}$$

These reactions are reversible reactions, exhibit large variations in equilibrium composition depending on temperatures, and require high temperatures to achieve sufficiently high reaction rates. First, in the reformer, the reactions of (Equation 1) and (Equation 2) proceed in parallel.

As for the reforming catalyst used here, a nickel-based metal or ruthenium-based metal supported on an oxide, for example, is known. Since the reforming reaction using steam is an endothermic reaction, the reaction is performed while maintaining the temperature of the catalyst at 600° C. or higher. For heating, it is known to combust part of the feedstock methane and to utilize the resulting combustion heat, for example. To reduce the amount of heat consumption in consideration of the generation efficiency of hydrogen, the reforming reactor and gas flow passage are designed so as to reduce heat dissipation as much as possible. Japanese Laid-Open Patent Publication Nos. Hei 5-301701 and Hei 7-291602, for example, propose a method for reducing heat dissipation by providing an apparatus having a concentric multi-turn tube configuration with a heating section located at the center.

Next, in the shift reactor, carbon monoxide in the reformed gas is shifted to carbon dioxide. The shift reaction proceeds in accordance with the reaction represented by (Equation 3).

The reformed gas contains more than few percents carbon monoxide as a byproduct, and by the reaction of (Equation 3), hydrogen is generated and the hydrogen concentration is increased to reduce the carbon monoxide concentration. However, since this carbon monoxide is poisonous to the electrode catalyst of the fuel cell, the concentration must be further reduced.

Known examples of the shift catalyst used here include an iron-chromium based high-temperature shift catalyst which exhibits high activity at around 350° C., and a copper-zinc based low-temperature shift catalyst which exhibits high activity at around 200° C.

The reaction of (Equation 3) is an exothermic reaction, and lower catalyst temperatures are advantageous since equilibrium moves toward the right-hand side at lower temperatures. That is, the carbon monoxide concentration in the shifted gas can be reduced down to several thousands ppm.

In particular, when hydrogen is supplied to a solid polymer fuel cell, the process of removing carbon monoxide by selective oxidation or methanation using a catalyst becomes necessary in order to further reduce the carbon monoxide concentration. However, if the reactivity of the shift reactor can be increased sufficiently, the carbon monoxide concentration in the shifted gas can be held within a specified value, making it easier to remove the carbon monoxide by the subsequent selective oxidation or methanation reaction.

In the case of phosphoric acid fuel cells and solid polymer fuel cells operating at low temperatures, the fuel reforming reaction and the carbon monoxide shift reaction and selective oxidation reaction (purifying reaction) are required, as earlier noted. However, since the reaction temperature greatly differs from one reaction to another, it is important to perform temperature control so that each reactor is held at the appropriate temperature for their operations. In this case, the reaction temperature for the reforming reaction must be the highest, and the reaction temperature must be lower for the shift reaction and the oxidation reaction in this order. Furthermore, to increase the operating efficiency of the apparatus, it is desirable that excess heat from each reactor be recovered to control the temperature.

In the presently available solid polymer fuel cells, a fluorocarbon resin with a terminal substituted by a sulfonic group is used for the proton conducting membrane, which is a constituent element of the cell. At this time, the proton conducting membrane must be swelled with water. Considering this, it is desirable to supply the hydrogen gas with as high humidity as possible. However, adding steam to the fuel gas requires much energy. It thus becomes necessary to utilize the excess heat as effectively as possible.

Development has been proceeding vigorously for practical implementation and commercialization of fuel cell systems, which is integrally constituted by combining a hydrogen generating apparatus based on the steam reforming method as described above, with a fuel cell, a DC-AC converter and other auxiliaries.

In particular, in residential or vehicular fuel cell systems, compared with traditional large-scale fuel cell systems, electricity output must be varied quickly to meet changing load. Accordingly, to operate fuel cells efficiently, it is desirable that the hydrogen generating apparatus be capable of adjusting the amount of hydrogen gas production in accordance with changing load, without entailing a decrease in hydrogen concentration or an increase in carbon monoxide concentration.

In practice, however, it is difficult to vary the hydrogen gas production amount while maintaining the fuel cell efficiency at a high level. In particular, in the shift reactor in the hydrogen generating apparatus, it is possible to hold the carbon monoxide concentration in the hydrogen gas within a specified value and yet bring the hydrogen concentration close to the theoretical value, while maintaining the amount of hydrogen gas production constant. However, the problem is that, if the amount of hydrogen gas production is varied even slightly, the amount of non-reacted carbon monoxide tends to increase and the hydrogen concentration tends to decrease. The reality is that presently no means is available that can easily control the hydrogen production amount by alleviating such a phenomenon, and this has been a major problem yet to be resolved.

It is accordingly an object of the present invention to provide a hydrogen generating apparatus capable of readily adjusting the hydrogen gas production amount by effectively utilizing heat from the various reactions. It is a further object of the invention to provide a hydrogen generating apparatus capable of supplying a constant concentration hydrogen gas while keeping the concentration of byproduct carbon monoxide low, regardless of whether the production amount is large or small.

BRIEF SUMMARY OF THE INVENTION

The present invention concerns a hydrogen generating apparatus comprising: a reformer including a reforming catalyst layer for generating from a fuel a reformed gas containing at least hydrogen; a heating section for heating the reforming catalyst layer; a fuel supply section for supplying the fuel to the reformer and the heating section; a water supply section for supplying water to the reformer; a shift reactor including a shift catalyst layer for shifting carbon monoxide in the reformed gas to carbon dioxide by causing the reformed gas to react with water; and a temperature detector for detecting the temperature of a downstream portion of the shift catalyst layer, and wherein: the hydrogen generating apparatus is operated in such a manner that, when an amount of the reformed gas supplied to the shift reactor is increased, the temperature of the downstream portion of the shift catalyst layer is raised to a higher temperature than the temperature of the same before the increase of the reformed gas, and when the amount of the reformed gas supplied to the shift reactor is decreased, the temperature of the downstream portion of the shift catalyst layer is lowered to a lower temperature than the temperature of the same before the decrease of the reformed gas.

It is effective that the hydrogen generating apparatus further comprises a first heat exchanger installed at least on the downstream side of the shift catalyst layer, wherein the shift catalyst layer is cooled by passing through the heat exchanger at least one medium selected from the group consisting of the fuel and water to be supplied to the reformer and air and fuel to be supplied to the heating section.

Also, it is effective that the hydrogen generating apparatus further comprises a purifier installed on the downstream side of the shift reactor for removing carbon monoxide from a shifted gas from the shift reactor by an oxidation reaction and/or a methanation reaction.

Also it is effective that the hydrogen generating apparatus further comprises an air supply section for supplying air to the shifted gas, which is supplied to the purifier.

It is effective that the water supply section supplies water also to the shift reactor.

Further effectively, the hydrogen generating apparatus further comprises a first water vaporizer installed between the fuel supply section and the reformer and a second water vaporizer installed between the reformer and the shift reactor, wherein the water supply section supplies water also to the first and the second water vaporizers, and wherein steam generated from the first vaporizer is supplied to the reformer and steam generated from the second vaporizer is supplied to the shift reactor.

It is effective that the hydrogen generating apparatus further comprises a means for regulating the supply amount of water to the second vaporizer, wherein the temperature of the shift reactor is controlled by regulating the supply amount.

Further effectively, the hydrogen generating apparatus further comprises a means for controlling proportions of water supplied to the first vaporizer and the second vaporizer, wherein the supply amount of water to the reformer and the shift reactor is maintained constant by controlling the proportions.

Preferably, the hydrogen generating apparatus further comprises a second heat exchanger, installed between the reformer and the shift reactor, for performing heat exchange between the reformed gas and at least one medium selected from the group consisting of the fuel and water to be supplied to the reformer and air and fuel to be supplied to the heating section.

Also preferably, the hydrogen generating apparatus further comprises a third heat exchanger, installed between the shift reactor and the purifier, for performing heat exchange between the shifted gas and at least one medium selected from the group consisting of the fuel and water to be supplied to the reformer and air and fuel to be supplied to the heating section.

Effectively, the first heat exchanger includes a mixer, installed inside the shift catalyst layer or at the downstream side thereof, for mixing the reformed gas with water.

Effectively, the mixer comprises a porous base or heat resistive fiber.

Effectively, the shift catalyst layer comprises a catalyst material supported on a supporting base of a honeycomb structure or a foamed structure having communicating pores.

Effectively, the shift catalyst layer includes a portion formed from a metallic base or a heat conducting ceramic base.

Further effectively, the hydrogen generating apparatus further comprises oxidation preventing means, installed on the upstream and/or downstream side of the shift catalyst layer, for preventing oxidation of the shift catalyst.

Effectively, the oxidation preventing means shuts off a passage between the reformer and the shift reactor and/or a passage between the shift reactor and the purifier.

Preferably, the oxidation preventing means comprises a metal oxide, which is reducible in the reformed gas, supported on a carrier of a honeycomb structure, a foamed structure having communicating pores, or a mesh structure, or comprises a fiber of the oxide.

Further preferably, the oxidation preventing means includes a pressure control means for controlling the internal pressure of the shift reactor.

BRIEF DESCRIPTION OF SEVERAL VIEWS OF DRAWING

DETAILED DESCRIPTION OF THE INVENTION

Embodiment 1

Figure 1:
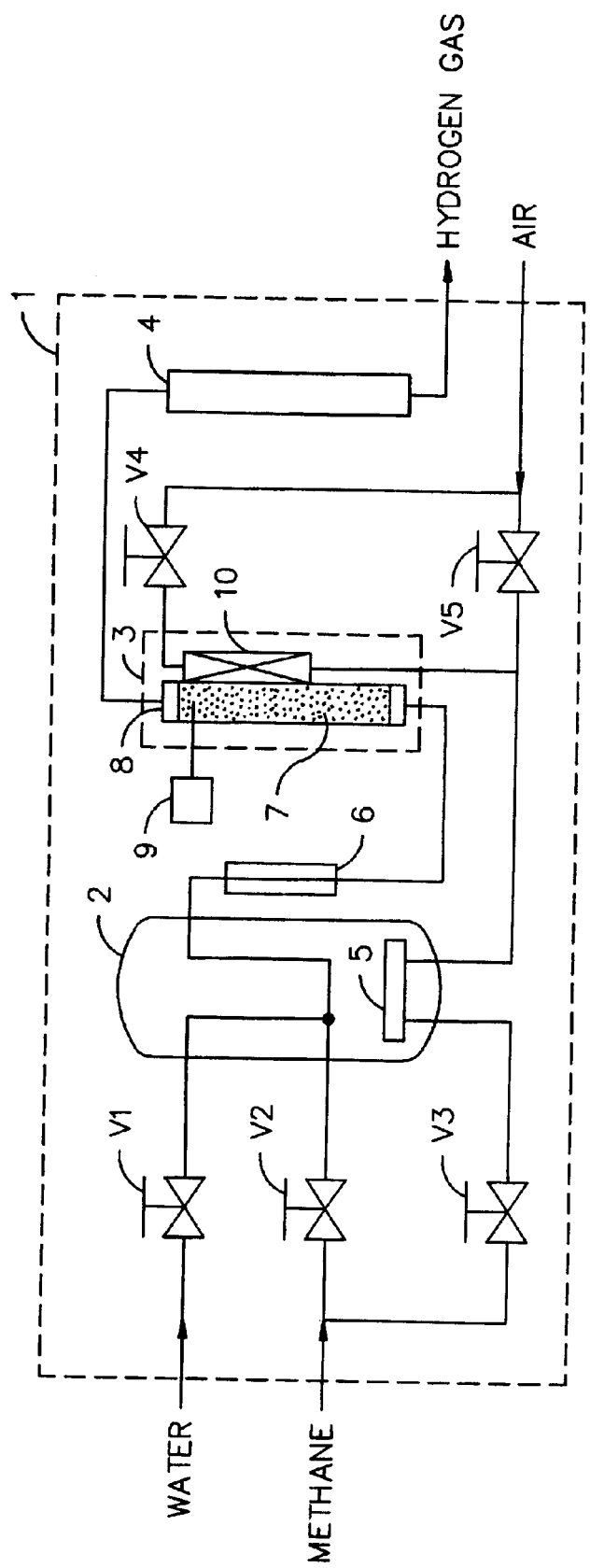
FIG. 1 is a diagram showing the construction of a hydrogen generating apparatus according to one embodiment of the present invention.

The hydrogen generating apparatus of the present invention will be described below by reference to the representative embodiments hereinafter shown, but it will be appreciated that the invention is not limited to the embodiments disclosed herein. FIG. 1 is a diagram showing the construction of one embodiment of the hydrogen generating apparatus according to the present invention. This hydrogen generating apparatus 1 is supplied with methane, water and air to generate hydrogen gas. The apparatus comprises a reformer 2, a shift reactor 3, a carbon monoxide stripper (purifier) 4, and a diffuser type combustor 5. The flow rates of water, methane as a feedstock to be reformed, and methane for combustion can be controlled by means of flow regulators V1, V2, and V3, respectively. The methane is separated at the entrance between two paths, one for a feedstock for steam reforming and the other for a fuel for combustion.

In the reformer 2, the diffuser type combustor 5 installed therein mixes the combustion methane with air and burns the mixture. Then, water is preheated and vaporized for mixing with methane, and the resulting mixture is passed over a heated reforming catalyst (nickel-based pelletized catalyst) within the reformer 2. The temperature of the reforming catalyst is held at around 700° C., though it may differ depending on the kind of catalyst used. At this time, the reforming reactions of (Equation 1) and (Equation 2) proceed inside the reformer 2.

Here, the reformer 2 is preferably constructed from heat resistive stainless steel or the like.

The reformed gas obtained by reforming methane in the reformer 2 contains hydrogen at high concentration as well as carbon monoxide and carbon dioxide. The reformed gas is cooled down to around 600° C. in a cooler 6 before being introduced into the shift reactor 3.

The carbon monoxide stripper 4 is provided in case there arises a need to further reduce the carbon monoxide concentration in the shifted gas obtained in the shift reactor 3. As is well known in the art, it is sufficient that the carbon monoxide stripper 4 is constructed to remove carbon monoxide by an oxidation reaction and/or a methanation reaction.

The shift reactor 8 contains a stainless steel reactor 8, which is filled with a copper-zinc based shift catalyst to form a shift catalyst layer 7. The reformed gas is passed through this shift catalyst layer 7 where the shift reaction shown by (Equation 3) is caused to proceed within a temperature range where the shift catalyst performs the function, and a shifted gas with reduced carbon monoxide concentration is thus output.

The most notable feature of the hydrogen generating apparatus of the present embodiment is that a heat exchanger 10 is installed in contact with a downstream portion of the shift catalyst layer 7. Combustion air for the reformer is passed through the heat exchanger 10 for heat exchange with the shift catalyst. The specific function of the heat exchanger 10 in the present invention and the control method will be described below.

The amount of air to be passed through the heat exchanger is controlled using flow regulators V4 and V5, and the temperature of the downstream side of the shift catalyst layer 7 is detected using a temperature detector 9.

The hydrogen generating apparatus shown in FIG. 1 was operated. The supply amounts of methane as a feedstock to be reformed and water were determined so that the steam/carbon ratio (S/C ratio) was 3. Assuming the production of hydrogen at a rate of 100 liters per minute, the supply amount of the feedstock methane was chosen to be 20 liters per minute, and that of the water was chosen to be 48.2 g per minute. Here, the supply amount of the feedstock methane was so set as to be able to supply the heat of reaction necessary for the reactions shown by (Equation 1) and (Equation 2). In the cooler 6, water in the amount proportional to the flow rate of the reformed gas was added to cool the reformed gas so that the temperature of the reformed gas introduced into the shift reactor 3 was maintained at a constant level.

As earlier noted, the hydrogen generating apparatus of the present invention is characterized by the construction of the shift reactor 3 and the control method thereof. That is, in operation, using the heat exchanger, the temperature of the downstream side of the shift catalyst layer in the shift reactor is raised when increasing the amount of hydrogen gas production, and is lowered when reducing the amount of hydrogen gas production.

To explain the effect obtained by such control method, the inventors conducted the below operations without passing air through the heat exchanger 10 in the shift reactor 3 and thus without using the heat exchanger as a comparative example. In first, the generation amount of hydrogen was gradually increased to a rate of 100 liters per minute from the standard rate of 50 liters per minute. In second, the generation amount of hydrogen was gradually reduced down to a rate of 20 liters per minute from the standard rate. The amount of the shift catalyst was set to the optimum level at which the carbon monoxide concentration in the shifted gas obtained from the shift reactor 3 was held within 1% when the amount of hydrogen production was 50 liters per minute.

The result showed that the temperature of the downstream side of the shift catalyst layer 7 in the shift reactor 3 tended to rise when the amount of hydrogen production was reduced and tended to lower when the amount of hydrogen production was increased. It was also found that the carbon monoxide concentration in the shifted gas at the outlet of the shift reactor 3 increased not only when the amount of hydrogen production was increased but also when it was reduced.

From the equilibrium of the reaction shown by (Equation 3) and the rate of reaction, it is suspected that the following is the cause for the above phenomenon. That is, when the amount of hydrogen production is reduced, the space velocity (SV) for the catalyst decreases; as a result, a degree of the shift reaction per unit time increases and the catalyst temperature rises. This temperature rise causes the equilibrium of the reaction shown by (Equation 3) to move to the left-hand side, increasing the carbon monoxide concentration.

On the other hand, when the amount of hydrogen production is increased, the space velocity (SV) for the catalyst increases; as a result, a degree of the shift reaction per unit time decreases and the amount of latent heat absorbed by the gas increases, so that the catalyst temperature lowers. Then, the equilibrium of the reaction shown by (Equation 3) shifts to the right-hand side, but since the reacting weight per unit time is small, non-reacted carbon monoxide remains and the carbon monoxide concentration increases.

To resolve the above problem, the hydrogen generating apparatus was operated with the heat exchanger 10 performing heat exchange between the shift catalyst in the shift catalyst layer 7 and the combustion air.

Here also, the generation amount of hydrogen was gradually increased to a rate of 100 liters per minute from the standard rate of 50 liters per minute or gradually reduced down to 20 liters per minute from the standard rate. The amount of the shift catalyst was set to the optimum level, at which the carbon monoxide concentration in the obtained shifted gas was held within 1% when the generation amount of hydrogen was 50 liters per minute and combustion air of ordinary temperature was passed through the heat exchanger 10 at a rate of 10 liters per minute.

When the generation amount of hydrogen was increased, the flow rate of the air supplied to the heat exchanger 10 was gradually decreased down to 5 liters per minute, and when the amount of hydrogen production was reduced, the flow rate of the combustion air was gradually increased up to 20 liters per minute. That is, the apparatus was operated such that the flow rate of the low temperature medium was relatively reduced to raise the temperature of the downstream side of the shift catalyst layer 7 when the amount of hydrogen production was large. Also, the apparatus was operated such that the flow rate of the low temperature medium was relatively increased to lower the temperature of the downstream side of the shift catalyst layer 7 when the amount of hydrogen production was small. The temperature of the downstream side of the shift catalyst layer 7 was detected using the temperature detector 9. As a result, the concentration of carbon monoxide in the shifted gas obtained from the shift reactor 3 was held within 1% and did not rise.

From the equilibrium of the reaction shown by (Equation 3) and the rate of reaction, it is suspected that the following is the cause for the above phenomenon. That is, when the generation amount of hydrogen is reduced, the space velocity (SV) for the catalyst decreases, which enhances a degree of the shift reaction per unit time. But since the amount of heat removal by the heat exchanger 10 is relatively increased, the temperature of the downstream side of the catalyst layer 7 lowers. This temperature drop causes the equilibrium of the reaction shown by (Equation 3) to move to the right-hand side. As a result, the carbon monoxide concentration does not increase.

On the other hand, when the generation amount of hydrogen is increased, the space velocity (SV) for the catalyst increases, which enhances a degree of the shift reaction per unit time and increases the amount of latent heat absorbed by the gas. But since the amount of heat removal by the heat exchanger 10 is relatively reduced, the temperature of the downstream side of the catalyst layer 7 rises. This temperature rise causes the equilibrium of the reaction shown by (Equation 3) to move to the left-hand side, but since the reacting weight per unit time is large, in this case also the carbon monoxide concentration does not increase.

Here, the heat exchanger 10 is installed at least on the downstream side of the catalyst layer 7 in order to control the outlet temperature of the catalyst layer 7 in a reliable manner. This is because the shift reaction shown by (Equation 3) is a reversible reaction, which reaches the equilibrium depending on the temperature, and because the temperature near the outlet of the catalyst layer 7 influences the composition of the finally obtained shifted gas.

Figure 2:
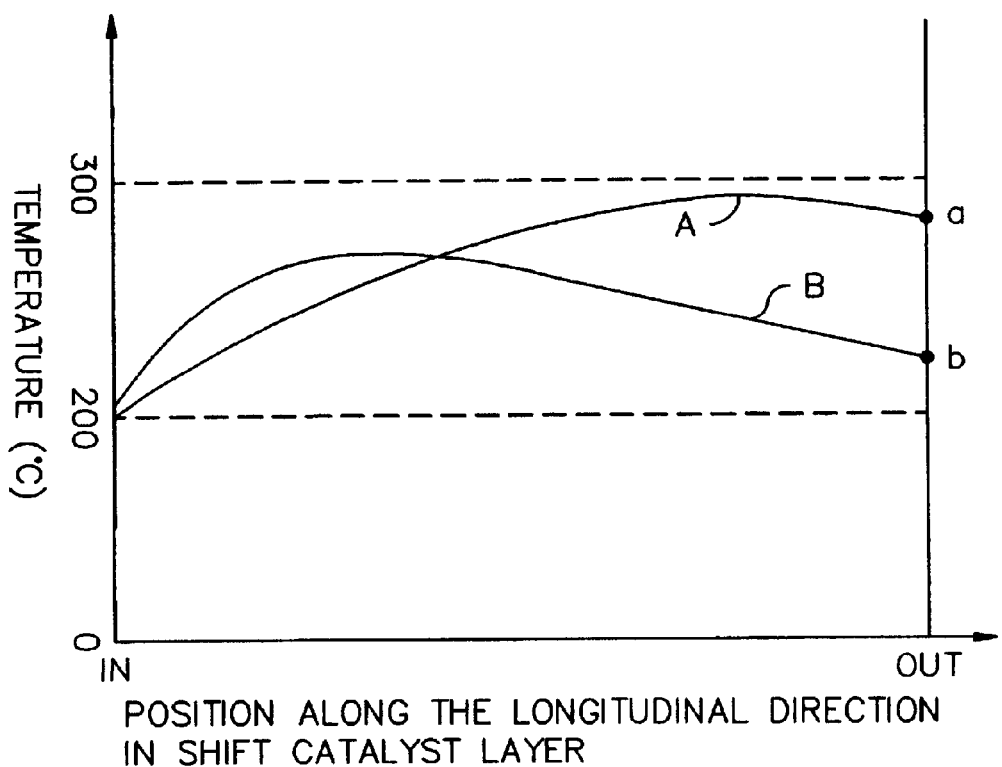
FIG. 2 is a diagram showing the relationship between the temperature of a shift catalyst layer and the position along the longitudinal direction thereof.

FIG. 2 shows the relationship between the temperature of the shift catalyst layer 7 and the position along the longitudinal direction thereof.

Since the shift reaction shown by (Equation 3) is an exothermic reaction, the temperature of the shift reactor 3 has a tendency to rise, and is supposed to describe a curve similar to those shown in FIG. 2. In FIG. 2, "A" is the temperature curve when the amount of hydrogen production is large, and "B" is the temperature curve when the amount of hydrogen production is small. In the hydrogen generating apparatus of the present embodiment, the outlet temperature is high (point a) when the amount of hydrogen production is large, and low (point b) when the amount of hydrogen production is small. As a result, the carbon monoxide concentration in the shifted gas at the outlet of the shift reactor 3 was held within the specified value.

As described above, in the hydrogen generating apparatus of the present invention, when the generation amount of hydrogen is large, the amount of heat removal by the heat exchanger 10 in the shift reactor 3 is increased to lower the temperature at the outlet of the shift catalyst layer 7. This causes the equilibrium of the shift reaction shown by (Equation 3) to shift toward the right-hand (product) side, so that the carbon monoxide concentration in the resulting shifted gas does not increase.

On the other hand, when the generation amount of hydrogen is small, the amount of heat removal by the heat exchanger 10 is reduced to raise the temperature of the shift catalyst layer 7. This serves to increase the reacting amount of the shift reaction, as a result of which the carbon monoxide concentration in the resulting shifted gas does not increase.

That is, even if the generation amount of hydrogen is varied, the carbon monoxide concentration in the resulting shifted gas (hydrogen gas) can be held low and the hydrogen concentration high, making it possible to meet changing load of the fuel cell.

In the present embodiment, the carbon monoxide stripper 4 is provided. But since the carbon monoxide concentration in the shifted gas can be sufficiently reduced, the removing effect of the carbon monoxide stripper 4 may be reduced, or the carbon monoxide remover 4 itself may be omitted, depending on the purpose of the produced hydrogen gas (shifted gas).

The invention may also be carried out by flowing combustion methane through the heat exchanger 10. Further, if a hydrocarbon as a feedstock to be reformed or water is passed through it, the reforming efficiency improves.

It is also possible to control the temperature of the shift catalyst layer 7 to achieve the temperature requirements shown in the present invention by using, for example, an outer wall of the reactor 8, instead of using the heat exchanger 10.

As described above, according to the present embodiment, the carbon monoxide concentration can be held low in the hydrogen gas (shifted gas) obtained from the shift reactor in the hydrogen generating apparatus employing the steam reforming method, regardless of whether the generation amount of hydrogen is large or small. Further, the hydrogen concentration can be held high at a value close to the theoretical value. When the hydrogen generating apparatus is equipped with this shift reactor, the amount of hydrogen gas production can be varied in accordance with changing load of the cell. For example, when supplying hydrogen to a phosphoric acid fuel cell, the supply amount of hydrogen gas can be varied without reducing the activity of the electrode catalyst. Further, when supplying hydrogen to a polymer fuel cell, since the carbon monoxide concentration at the outlet of the shift reactor can be held within the specified value, the burden of the subsequent carbon monoxide removal process can be alleviated. Here also, the supply amount of hydrogen gas can be varied without reducing the activity of the electrode catalyst.

Embodiment 2-1

Figure 3:
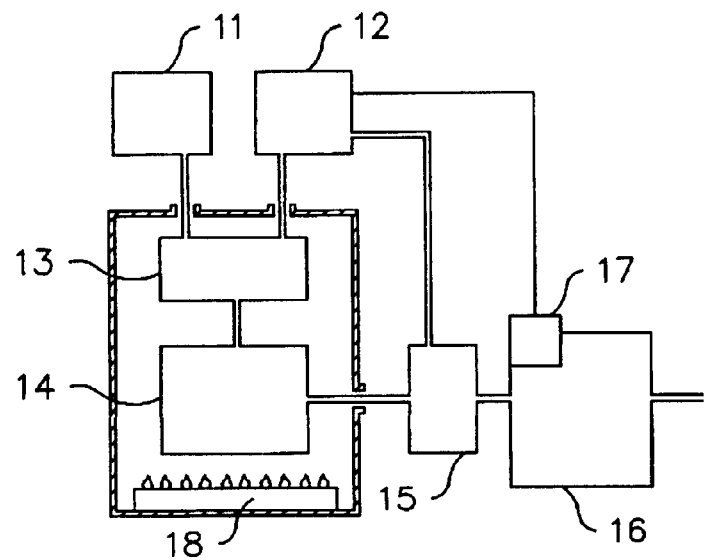
FIG. 3 is a diagrammatic cross sectional side view showing the construction of a hydrogen generating apparatus according to an embodiment 2-1 of the present invention.

FIG. 3 is a diagrammatic cross sectional side view showing the construction of a hydrogen generating apparatus according to an embodiment 2-1 of the present invention. In FIG. 3, reference numeral 11 is a supply section for supplying an organic compound as a feedstock; in the present embodiment, this section is constructed as a gas supply section which supplies a hydrocarbon gas composed principally of methane. Reference numeral 12 is a water supply section containing water, and 13 is a first vaporizer for vaporizing the water. Reference numeral 14 is a reformer containing a reforming catalyst; a noble metal-based catalyst supported on alumina pellets is used as the reforming catalyst. Reference numeral 16 is a shift reactor containing a shift catalyst for causing carbon monoxide to react with water; a Cu—Zn based catalyst is used as the shift catalyst. Reference numeral 15 is a second water vaporizer provided between the reformer 14 and the shift reactor 16, and water is supplied from the water supply section 12. Reference numeral 17 is a temperature detector for detecting the catalyst temperature of the shift reactor 16, and 18 is a heating section which is a flame burner as a heating means for supplying the amount of heat necessary for the reforming reaction in the reformer 14.

Next, the operation will be described. First, water is fed from the water supply section 12 into the first vaporizer 13 where the water is vaporized by the heat from the heating section 18. At the same time, the hydrocarbon gas as the feedstock is fed from the gas supply section 11 into the first vaporizer where the gas is mixed with the steam, and the mixture is fed into the reformer 14. In this way, in the present embodiment, the burner exhaust heat after heating the reformer is utilized to preheat the feedstock hydrocarbon gas and water for mixing, and the mixture is supplied to the reformer.

In the reformer, the supplied steam and hydrocarbon gas are caused to react for reforming over the reforming catalyst. Since the reforming reaction of water and hydrocarbon components is endothermic, the heat necessary for the reaction is supplied from the heating section installed below the reformer. The reformed gas after the reforming reaction is fed into the second vaporizer 5. At this time, water is also fed into the second vaporizer and, after being heated and vaporized by the heat of the reformed gas, is mixed with the reformed gas, and the mixture is fed into the shift reactor 16. In the shift reactor, a shift reaction takes place between water and carbon monoxide by the action of the shift catalyst. The temperature of the shift catalyst is detected by the temperature detector 17. Based on the detected temperature, the supply amount of water from the water supply section to the second vaporizer is controlled so that the catalyst is maintained at a set temperature.

When an organic compound and water are subjected to reforming reaction, hydrogen, carbon dioxide, and carbon monoxide are produced. The reforming reaction is endothermic, and in order for the reaction to proceed effectively, the catalyst must be held at high temperature during the reforming. The proportions of carbon dioxide and carbon monoxide produced differ depending on the reaction conditions; at higher temperatures, the proportion of carbon monoxide increases. Further, reaction with carbon monoxide generates a less amount of hydrogen compared to reaction with carbon dioxide.

In the case of phosphoric acid fuel cells and polymer fuel cells operating at low temperatures, it is not desirable if the hydrogen fuel gas contains a high concentration of carbon monoxide. Therefore, using a carbon monoxide shifting catalyst, carbon monoxide after reforming is caused to react with water for conversion to hydrogen and carbon dioxide. A Fe—Cr based catalyst, which reacts at relatively high temperature (500 to 300° C.), and a Cu—Zn based catalyst, which reacts at relatively low temperature (300 to 200° C.), are used as the shift catalyst. However, since usually the reforming reaction proceeds at 600° C. or higher temperature, the reformed gas released from the reformer is at a high temperature close to the catalyst temperature; if this gas is directly introduced into the shift catalyst, it is obvious that the shift reaction does not proceed sufficiently because the shift catalyst temperature becomes high.

Accordingly, it is commonly practiced to use the high temperature and low temperature shift catalysts in combination and to perform the shift reaction by gradually lowering the temperature. With this method, it is difficult to effectively utilize the heat that the reformed gas after reforming has. Further, from the viewpoint of the equilibrium of the water/carbon monoxide reaction, it is desirable to stabilize the catalyst temperature at low temperature and to add a-substantial amount of water. However, adding water requires a lot of energy, which is not desirable when the efficiency of the hydrogen generating apparatus is considered. In the hydrogen generating apparatus of the present embodiment which resolves this problem, water is added to the reformed gas after reforming, and the water is heated by effectively utilizing the heat of the reformed gas. And, at the same time, the catalyst temperature is stabilized, and the shift reaction of the carbon monoxide is-effectively accomplished.

Next, a specific operational example of the present embodiment will be described. When a hydrocarbon gas composed principally of methane gas is steam-reformed, the reformed gas temperature after reforming exceeds 600° C.; if this gas were directly introduced into the shift reactor, the shift catalyst would deteriorate because of high temperature. To address this, in the present embodiment, the temperature of the reformed gas is lowered by supplying water to the reformed gas fed into the second vaporizer. At this time, the catalyst temperature is detected by the temperature detector attached to the shift reactor and, based on the detected temperature, the amount of water supplied to the second vaporizer is controlled so that the reformed gas is cooled to the optimum catalyst operating temperature. In this method, the addition of water has the effect of greatly reducing the carbon monoxide concentration in the shifted gas compared with the case when the reformed gas was air cooled to the optimum catalyst operating temperature.

An example will be shown. When a reformed gas, steam-reformed by adding water in an amount three times the number of carbon atoms contained in a feedstock hydrocarbon, is fed into the shift catalyst after air cooling, the carbon monoxide concentration in the shifted gas is about 0.5 to 0.6%. On the other hand, in the method of the present invention in which the reformed gas is fed into the shift catalyst after lowering the temperature of the reformed gas by further adding water in an amount two times that, the carbon monoxide concentration in the shifted gas can be reduced to about 0.2 to 0.3%.

When supplying a hydrogen-containing reformed gas to a solid polymer fuel cell, account has to be taken of the effect that the relative humidity of the reformed gas has on the electricity generating characteristic of the fuel cell. The electricity generation characteristic improves as the amount of steam contained in the reformed gas becomes closer to the saturated steam amount at the operating temperature of the cell electrode. Accordingly, further adding humidity to the reformed gas before supplying it to the fuel cell, as practiced in the present embodiment, is preferable from the point of view of improving the electricity generation characteristic. When the operating temperature of the fuel cell electrode is 80° C., for example, if the shifted gas was produced after being reformed by adding water in an amount three times the number of carbon atoms contained in the feedstock hydrocarbon, the amount of steam remaining in the shifted gas would not be sufficient for cell operation.

It would then become necessary to re-humidify the gas before being supplied to the fuel cell. However, by further adding water before the shift reaction, as shown in the present embodiment, the step of re-humidification can be omitted. More specifically, the method that adds water to the reformed gas after reforming not only serves to promote the stabilization of the catalyst temperature and the shift reaction of carbon monoxide, but also achieves the effect of saving energy corresponding to the heat value of about 11 kcal/mol that becomes necessary when adding water, since the necessary heat is supplied utilizing the heat that the reformed gas has.

Here, the degree of humidity added to the reformed gas must be determined in relation to the operating temperature of the cell. If the reformed gas were supplied with an amount of humidity having a dew point exceeding the operating temperature of the cell, condensation would occur within the cell, resulting in an unstable electricity generation characteristic. Therefore, the total amount of water supplied to the hydrogen generating apparatus must be determined in consideration of the operating temperature of the cell. That is, when supplying a hydrogen-containing reformed gas to a solid polymer fuel cell, it also becomes important to control the proportions of water supply to the first and second vaporizers so that the amount of water supply to the reformer and shift reactor is maintained constant.

The present embodiment has been described dealing with a construction having the first and second water vaporizers, but as long as the water necessary for the reforming and shift reactions can be supplied, the water may be supplied directly to the reformer and the shift reactor. Further, under conditions where the temperature of the shift catalyst is constant, that is, when the amount of hydrogen generation is constant, for example, there is no need to provide a temperature detector on the shift reactor because the amount of water supply can be set constant.

Although hydrocarbon gas composed principally of methane has been used as the feedstock in the present embodiment, the feedstock need not be limited to the hydrocarbon gas. But a compound having a hydrogen atom within the molecule, for example, alcohol such as methanol, or other organic compound such as a naphtha component, capable of the reforming reaction with water, may also be used as the feedstock. Further, an organic compound not directly capable of the reforming reaction can also be used as the feedstock by subjecting it to pretreatment such as fermentation decomposition or cracking.

Further, in the present embodiment, the heating section has been described as being constructed from a flame burner. But any heating means by other heating methods using, for example, catalyst combustion, boiler waste heat, or combustion heat of the feedstock organic compound generated by adding air to the feedstock may be used. It is noted that, in any case, the heating section should be constructed to supply the amount of heat necessary for the reforming reaction.

Embodiment 2-2

Figure 4:
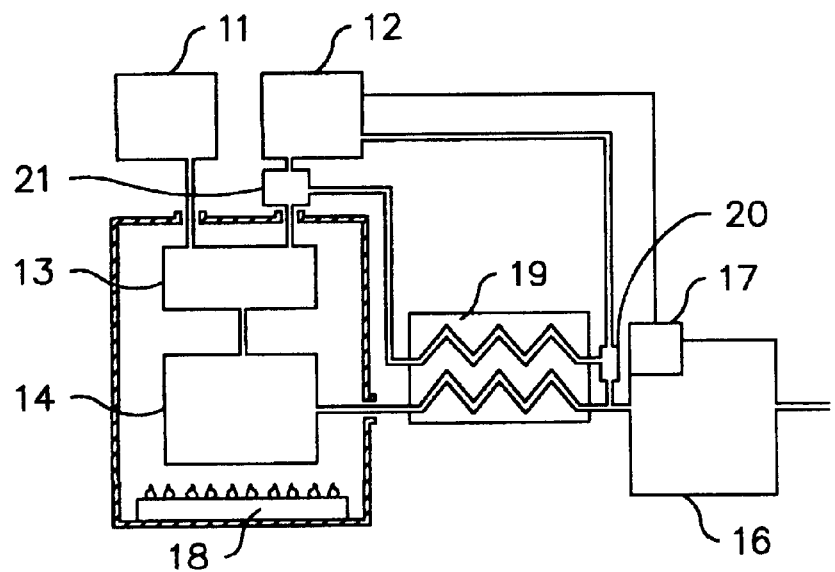
FIG. 4 is a diagrammatic cross sectional side view showing the construction of a hydrogen generating apparatus according to an embodiment 2—2 of the present invention.

FIG. 4 is a diagrammatic cross sectional side view showing the construction of a hydrogen generating apparatus according to an embodiment 2-2 of the present invention. Explanatory descriptions of the same component elements as those in the hydrogen generating apparatus of the embodiment 2-1 shown in FIG. 3 will not be repeated here. Differences are as in the followings. In first, a heat exchanger 19, where the reformed gas exchanges heat with water, is provided on the downstream side of the reformer 14 as viewed along the flowing direction of the reformed gas. In second, a water redirector 20 for redirecting water to the heat exchanger 19 and shift reactor 16 is provided at the water supply inlet to the heat exchanger 19. Finally, a mixer 21 is provided which mixes the heat exchanged water from the heat exchanger with the water to be supplied to the reformer.

In this embodiment, hydrogen is generated in much the same way as in the embodiment 2-1. The difference is that not only is water directly supplied to the reformed gas after reforming, but also the heat exchanged water from the heat exchanger 19 is fed into the mixer 21 and then supplied to the source gas.

As noted in the embodiment 2-1, since the gas released from the reformer 14 is at high temperature, if it is directly fed into the shift reactor, the reaction on the shift catalyst does not proceed effectively. In view of this, in the present embodiment, heat exchange between the reformed gas and water is performed in the heat exchanger 19 in order to control the temperature of the shift reactor. The heat exchanged water is then fed into the mixer where it is mixed with the water being supplied to the reformer. Since the temperature of the supply water is raised using the excess heat obtained after the reforming, the amount of heat that the heating section supplies during reforming can be reduced, and thus the efficiency as the apparatus can be enhanced. As an example, when a hydrocarbon composed principally of methane is used as the feedstock and subjected to reforming, it has been confirmed that, with the present embodiment, the amount of heat supplied to the reformer can be reduced by about 10% compared with a construction without a heat exchanger.

Further, as noted in the embodiment 2-1, when supplying a hydrogen-containing reformed gas to a solid polymer fuel cell, humidity control of the reformed gas is important. However, in the case of phosphoric acid fuel cells and other hydrogen utilizing apparatus, it is often not desirable if the reformed gas contains large quantities of steam. In the present embodiment, since the amount of humidity can be reduced, not only can the above problem be solved, but effective utilization of heat is achieved by using the excess heat to heat the feedstock.

If the temperature of the shift reactor cannot be controlled sufficiently by the heat exchanging in the heat exchanger, or if humidity control becomes necessary, the purpose can be accomplished by supplying water from the water redirector 20 directly to the reformed gas.

The embodiment has been described as using water as one medium for the heat exchange. But heat exchange may be performed between the feedstock organic compound as one medium and the reformed gas as the other medium; in this case also, the temperature control of the shift reactor and the heating of the feedstock can be accomplished.

Embodiment 2-3

Figure 5:
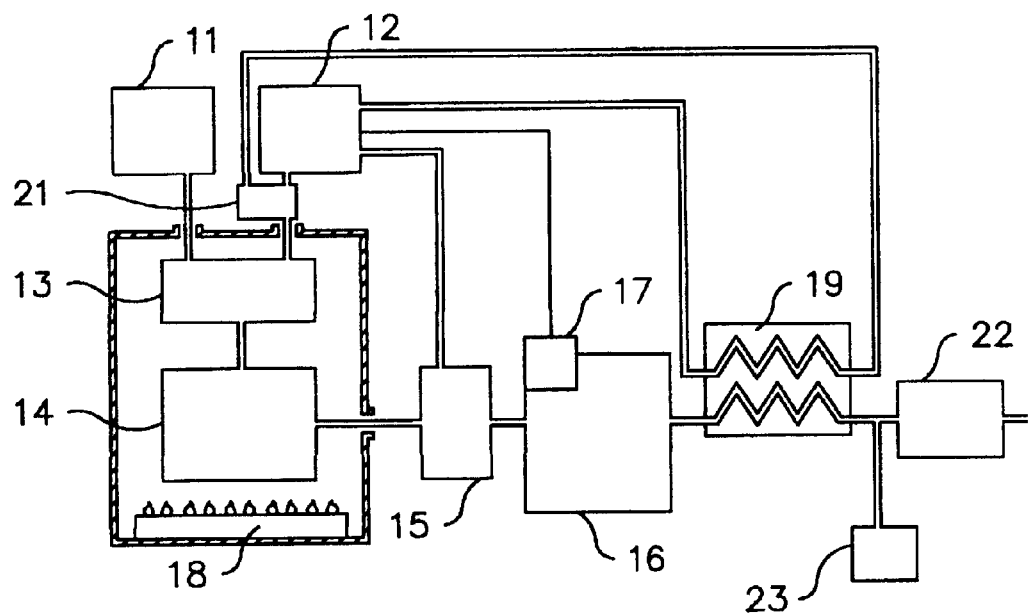
FIG. 5 is a diagrammatic cross sectional side view showing the construction of a hydrogen generating apparatus according to an embodiment 2-3 of the present invention.

FIG. 5 is a diagrammatic cross sectional side view showing the construction of a hydrogen generating apparatus according to an embodiment 2-3 of the present invention. Explanatory descriptions of the same component elements as those in the embodiment 2-1 shown in FIG. 3 will not be repeated here. Differences are as in the followings. In first, a heat exchanger 19 where the shifted gas exchanges heat with water and a mixer 21 where the heat exchanged water is mixed with the water being supplied to the reformer are provided on the downstream side of the shift reactor 16 as viewed along the flowing direction of the shifted gas. And then, an air supply section 23 for supplying air to the heat-exchanged shifted gas and a purifier 22 for purifying the shifted gas by oxidizing carbon monoxide contained therein are provided. The embodiment further differs from the embodiment 2-1 in that the water heat-exchanged with the shifted gas in the heat exchanger 19 is supplied to the reformer, and in that air is supplied to the shifted gas to purify it in the purifier 22 by oxidizing carbon monoxide.

When supplying a hydrogen-containing reformed gas to a solid polymer fuel cell, it is desirable that the carbon monoxide concentration in the reformed gas be held as low as possible. Equilibrium carbon monoxide concentration in the catalyst used for a reforming reaction between carbon monoxide and water is, under normal conditions, about several thousands ppm, but this concentration level needs to be reduced further. In view of this, in the present embodiment, the purifier for oxidizing carbon monoxide for purification is provided after the shift reactor, to oxide the carbon monoxide and reduce the concentration thereof to several ppm. When oxidizing carbon monoxide, hydrogen is also oxidized; therefore, it is important to use a catalyst that can oxidize only the carbon monoxide as selectively as possible. From the viewpoint of the equilibrium of the reaction of carbon dioxide, carbon monoxide, and hydrogen, it is not desirable to heat the catalyst to high temperatures. In view of this, in the construction of the present embodiment, a platinum-based catalyst supported on mordenite-based zeolite is used as the catalyst material in the purifier, and the catalyst temperature is controlled at around 100 to 150° C.

On the other hand, the temperature of the shifted gas released from the shift reactor is around 200 to 250° C. It is therefore not desirable to introduce this gas directly into the purifier. Here, the heat exchanger for heat exchanging between the shifted gas and water is provided so that the shifted gas is cooled before it is introduced into the purifier. Furthermore, by using the heat exchanged water as a reforming material, the amount of heat that the heating section supplies during reforming can be reduced, and thus the efficiency as the apparatus can be enhanced. It has been confirmed that with the construction of the present embodiment, the carbon monoxide concentration can be stably reduced to 10 ppm or less, and also that the amount of heat supplied to the reformer can be reduced.

The present embodiment has been described as using a platinum-based catalyst supported on mordenite-based zeolite as the catalyst material in the purifier. But the catalyst material need not be limited to this specific example, and other catalyst materials can be used as long as they are capable of selective oxidation of CO in a hydrogen atmosphere at a low oxygen concentration. The embodiment has also been described as using water as one medium for the heat exchange. But heat exchange may be performed between the feedstock organic compound as one medium and the reformed gas as the other medium; in this case also, the temperature control of the shift reactor and the heating of the feedstock can be accomplished.

As described above, in the hydrogen generating apparatus of the present invention, the temperature of the shift catalyst in the shift reactor, which provided downstream from the reformer, is controlled by adding water to the gas released from the reformer. At this time, by controlling the amount of water supply based on the temperature detected by the temperature detector provided on the shift reactor, the temperature of the shift catalyst can be further stabilized.

The stabilization of the shift catalyst temperature contributes to achieving an effective shift reaction of the carbon monoxide contained in the gas released from the reformer. Further, by utilizing the heat of the reformed gas for the humidification of the gas, it becomes possible to reduce the amount of heat necessary for re-humidification when supplying the hydrogen-containing reformed gas to a fuel cell, especially, a solid polymer fuel cell.

Furthermore, by performing heat exchange between the heat contained in the reformed gas and the water or feedstock organic compound, stabilization of the shift reactor temperature is achieved. Further, by supplying the heat to the feedstock, it becomes possible to reduce the amount of heat necessary for the reforming reaction, making it possible to save energy in the hydrogen generating apparatus.

Moreover, by providing the feedstock/shifted gas heat exchanger after the shift reactor, the temperature of the purifier catalyst provided after the shift reactor can be stabilized, while achieving an energy saving effect in the production of hydrogen.

According to the second embodiment of the present invention, in a hydrogen generating apparatus using an organic compound and water as feedstocks, the carbon monoxide remaining in the reformed gas is effectively caused to react during the shift reaction by stabilizing the shift reactor temperature. And, the amount of heat necessary for the generation of hydrogen and the subsequent re-humidification is reduced by effectively utilizing the heat contained in the gas released from the reactor, achieving an energy saving effect.

Embodiment 3-1

Figure 6:
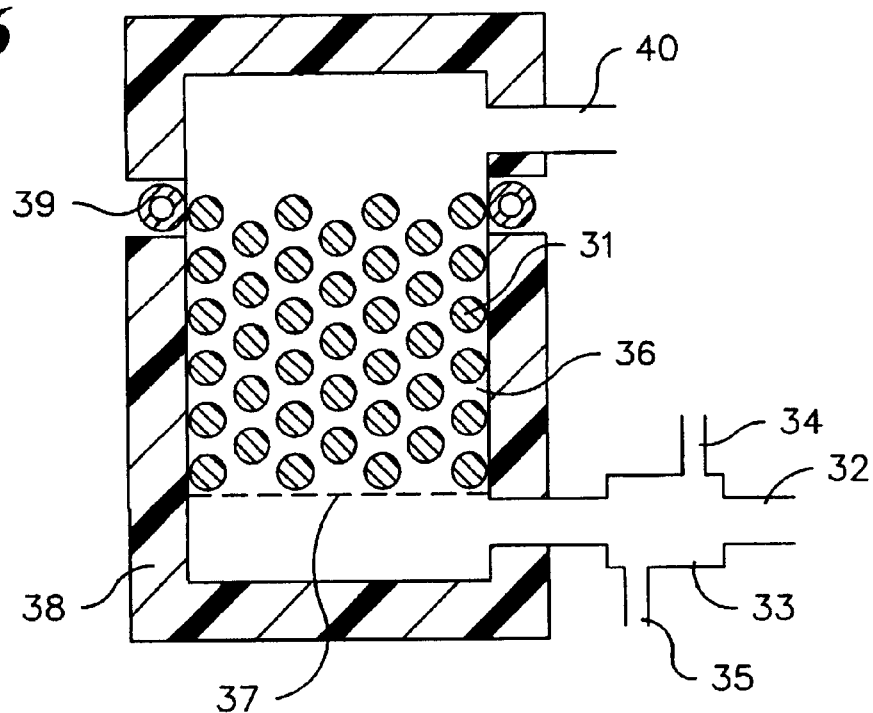
FIG. 6 is a diagrammatic cross sectional side view showing the construction of a hydrogen generating apparatus according to an embodiment 3-1 of the present invention.

FIG. 6 is a diagrammatic cross sectional side view showing the construction of a hydrogen generating apparatus according to an embodiment 3-1 of the present invention. The hydrogen generating apparatus shown in FIG. 6 comprises a catalyst 31, a reformed gas inlet 32, a heat exchanger 33, a cooling air inlet 34, a cooling air outlet 35, a reaction chamber 36, a catalyst supporting net 37, an insulator 38, a cooling water capillary 39, and a reformed gas outlet 40. The catalyst 31 here refers to an aggregate of catalyst pellets filled into the reaction chamber 36.

The operation and characteristics of the hydrogen generating apparatus according to the present embodiment will be described below. Examples of fuels used to produce the reformed gas include natural gas, methanol, gasoline and the like. Also, there are several methods of reforming, for example, steam reforming in which steam is added and partial reforming which performs reforming by adding air. The present embodiment will be described dealing with the case where a reformed gas is used that is obtained by steam-reforming natural gas. It will, however, be noted that there are no fundamental differences if other fuels are used, except that the composition of the generated gas somewhat differs.

The reformed gas, generated by mixing steam and natural gas and passing the mixture over a reforming catalyst, contains product hydrogen and byproduct carbon dioxide and carbon monoxide, plus a remnant of the steam added before reforming. The composition of the reformed gas somewhat varies depending on the catalyst temperature during reforming. Average reformed gas, excluding steam, contains about 80% hydrogen, about 10% carbon dioxide, and about 10% carbon monoxide. This reformed gas is fed through the reformed gas inlet 32. The reforming reaction of natural gas is performed at about 500 to 800° C., but the shift reaction is performed at about 150 to 350° C.; therefore, the reformed gas introduced through the reformed gas inlet 32 is cooled by the heat exchanger 33 where cooling air is circulated. The cooled reformed gas is introduced into the reaction chamber 36 where reaction takes place over the catalyst 31.

Figure 7:
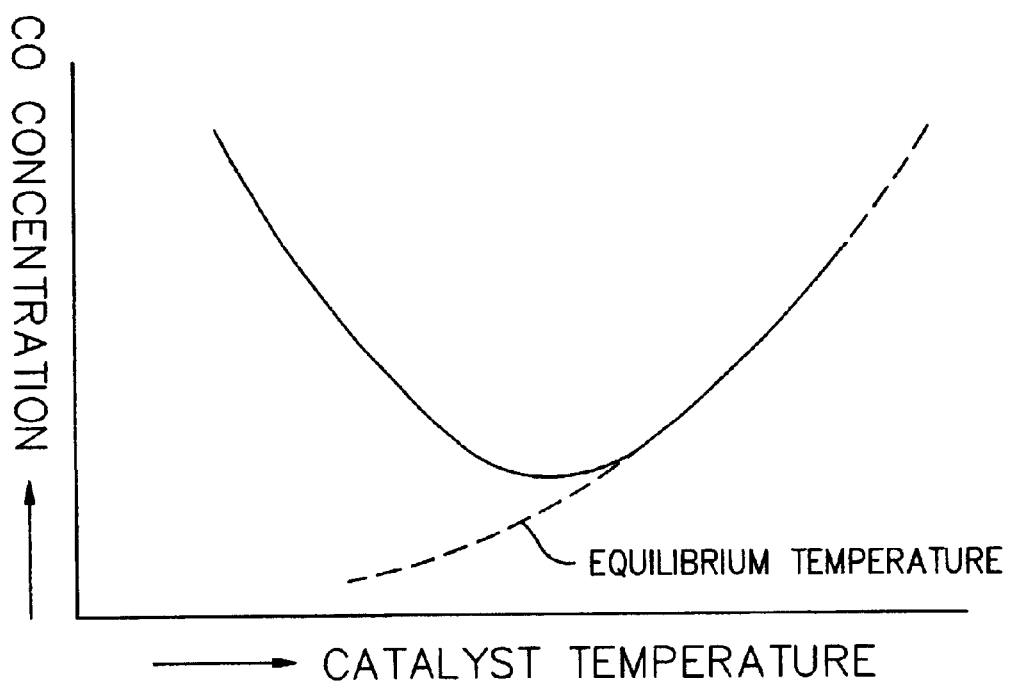
FIG. 7 is a diagram showing the relationship between the temperature of a conventional shift catalyst and the carbon monoxide concentration in a reformed gas after being passed over the shift catalyst.

Here, the relationship between the temperature of a conventional shift catalyst and the carbon monoxide concentration in the reformed gas after being passed over the shift catalyst is shown in FIG. 7. Dashed line in FIG. 7 indicates the carbon monoxide concentration when the reaction has proceeded over the catalyst until reaching a chemical equilibrium, while holding the supply gas composition constant. As is apparent from FIG. 7, the reaction in the shift catalyst reaches a chemical equilibrium in the high temperature range, while in the low temperature range, it is influenced by the reaction rate.

However, the temperature of the catalyst 31 must be held within the highest temperature that the catalyst can withstand. If there is no cooler on the downstream side, the temperate of the upstream side of the catalyst must be held low; in that case, however, the catalytic function does now work sufficiently in the upstream side and the reaction does not proceed effectively.

On the other hand, if there is a cooler on the downstream side, the temperate of the upstream side of the catalyst need not be held that low. Accordingly, the catalytic-function works sufficiently and, at the same time, the temperate of the downstream side of the catalyst can be held low, achieving a high performance. In this case, the carbon monoxide concentration can be reduced to several thousands ppm using a reactor smaller than the conventional one. Here, the cooling water capillary 39 is most preferably located at the downstream end of the catalyst 31. In that way, even when there occurs some variation in the flow rate of the reformed gas, stable performance can be obtained by controlling the temperature of the downstream end of the catalyst 31 at a constant level.

In the present embodiment, air is used as the thermal medium in the heat exchanger 33 for cooling the reformed gas. However, if water or steam is used as the medium before it is supplied to the reformer, heat can be effectively utilized, enhancing the efficiency of the fuel cell system.

In the present embodiment, a catalyst in pellet form is used as the catalyst. However, if the catalyst is formed from a catalyst material supported on a supporting base of a honeycomb structure or a foamed structure having communicating pores, the contact area between the catalyst and the reformed gas increases, allowing a further reduction in the size of the reactor.

Further, if a metallic base is used to construct a composite structure, for example, by using a metallic honeycomb for the supporting base, heat conduction improves. This serves to reduce the temperature difference between the upstream and downstream portions of the catalyst, preventing the temperature of the upstream portion from rising.

The present embodiment has used the reformed gas obtained by steam-reforming natural gas. However, if other fuels are used, no fundamental differences occurs, except that the proportions of carbon monoxide and carbon dioxide somewhat vary.

When a partial-reformed gas is used in which air is added instead of steam, water must be added before the gas is introduced into the reaction chamber 36 because the proportion of steam is low, but the operation is essentially the same.

In the present embodiment, the reformed gas is cooled with water circulating through the cooling water capillary 39. However, if necessary, an oily substance such as ethylene glycol having a high boiling point, or the liquid mixture, may be circulated through it. Alternatively, a water vaporizer or the like may be provided, and the gas may be cooled using the evaporation heat of the liquid.

Embodiment 3-2

Figure 8:
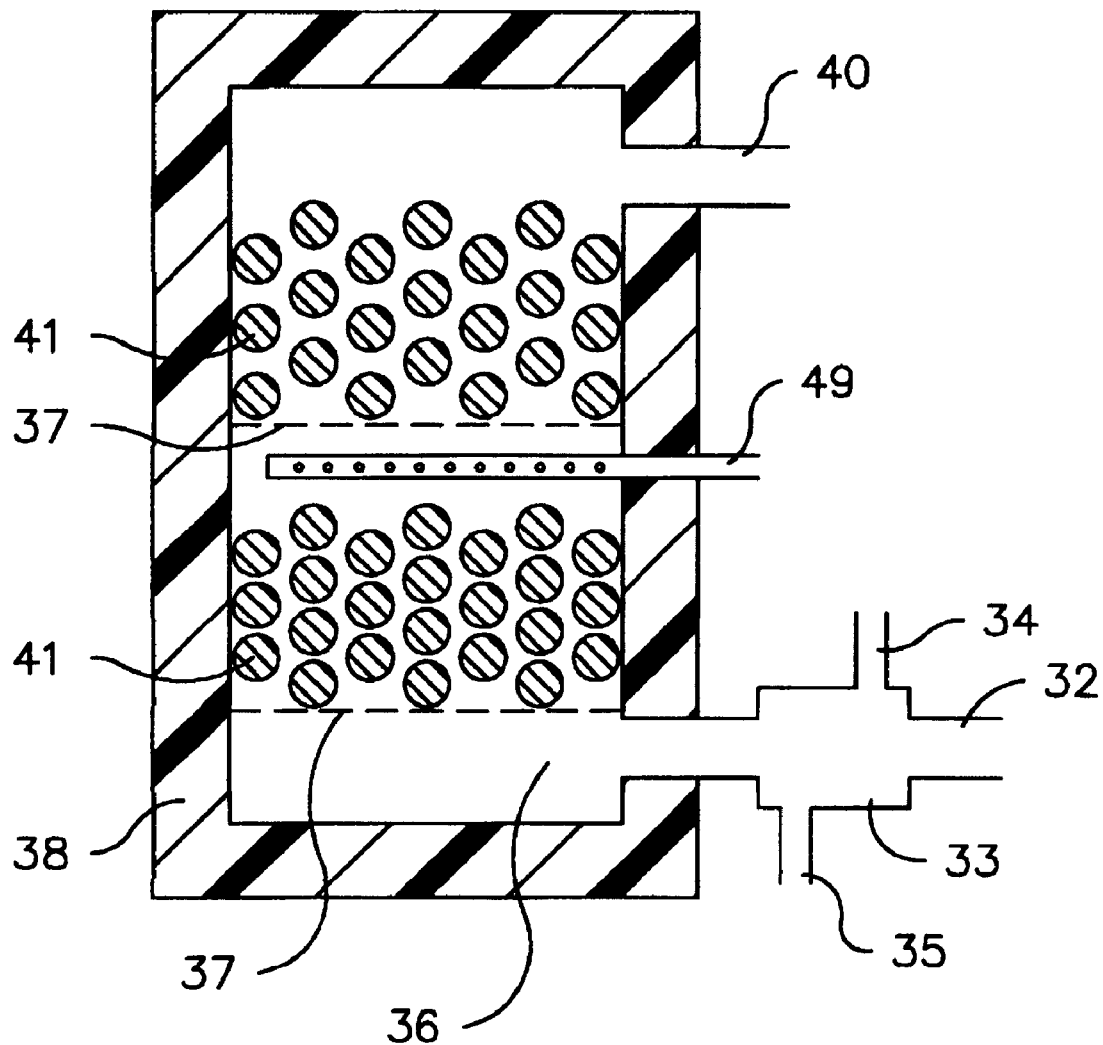
FIG. 8 is a diagrammatic cross sectional view showing the construction of a hydrogen generating apparatus according to an embodiment 3-2 of the present invention.

An embodiment 3-2 of the present invention will be described. In this embodiment, a catalyst 41 is split, as shown in FIG. 8, and a cooling water supply pipe 49 is provided between the split catalysts. Most of the operation and effect of this embodiment is similar to that of the embodiment 3-1. The following description, therefore, focuses on differences.

FIG. 8 is a diagrammatic cross sectional view showing the construction of the hydrogen generating apparatus according to the embodiment 3-2. Since the cooling water supply pipe 49 is provided in the downstream portion of the catalyst 41, the downstream portion-of the catalyst 41 can be cooled efficiently. At the same time, since the partial pressure of the steam increases, the equilibrium of the shift reaction can be shifted in the advantageous direction, and the carbon monoxide concentration can be reduced to several hundreds ppm at maximum. Further, since increasing the partial pressure of the steam in the shift reactor means reducing the load of a humidifier required in the subsequent fuel cell section, the overall system efficiency improves.

In the present embodiment, nothing but a space is provided at the outlet of the cooling water supply pipe 49, but if a porous base or a heat resistant fabric is placed at the outlet, that will help smooth vaporization of water. It will also help uniform mixing with the reformed gas, and a further stabilized characteristic can be obtained.

Further, in the present embodiment, cooling water is used for cooling the downstream portion of the catalyst, but instead, the water may be vaporized and supplied as steam. In this case, while the cooling efficiency somewhat drops, vaporized water is easier to mix with the reformed gas and the temperature becomes closer to the temperature of the catalyst 41 than when the water is supplied in the liquid state. This reduces the temperature variation due to cooling and achieves further stabilized operation.

Embodiment 3-3

Figure 9:
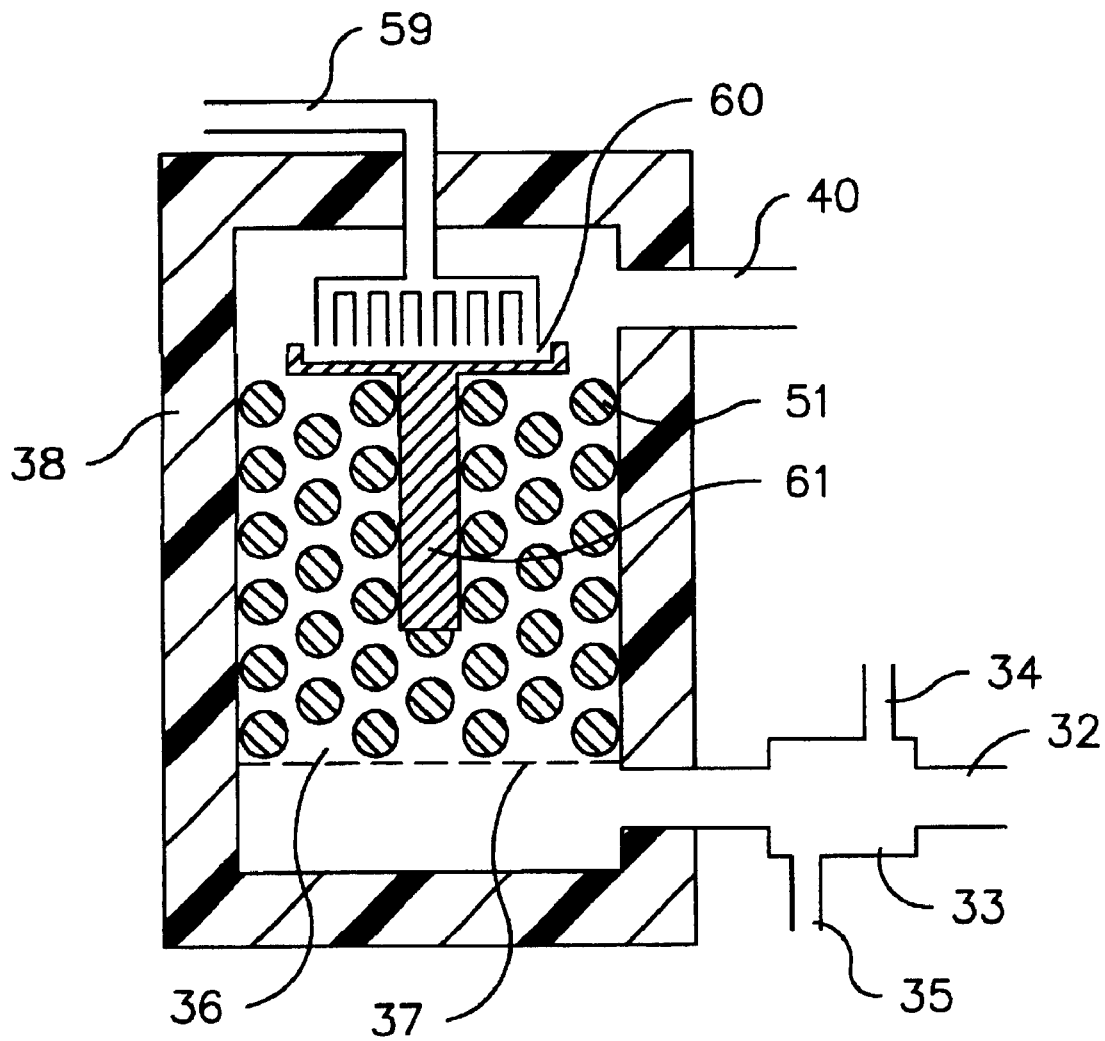
FIG. 9 is a diagrammatic cross sectional view showing the construction of a hydrogen generating apparatus according to an embodiment 3—3 of the present invention.

An embodiment 3-3 of the present invention will be described. In this embodiment, as shown in FIG. 9, a cooling water supply pipe 59, a cooling water vaporizing plate 60, and a heat conducting metallic rod 61 are provided at the downstream side of a catalyst 51. Most of the operation and effect of this embodiment is similar to that of the embodiment 3-2. The following description, therefore, focuses on differences.

FIG. 9 is a diagrammatic cross sectional view of the hydrogen generating apparatus according to the present embodiment. Since the cooling water supply pipe 59 is provided on the downstream side of the catalyst 51, the downstream end of the catalyst 51 can be cooled efficiently. Further, the provision of the cooling water vaporizing plate 30 serves to prevent liquid water from directly hitting the catalyst 51, thus preventing the temperature of the catalyst 51 from dropping abnormally. Moreover, because of the heat capacity of the cooling water vaporizing plate 60, temperature variation is reduced, and the operation is further stabilized. The heat conducting metallic rod is shown to have a length covering the middle to the downstream portion of the catalyst 51, but the length may be extended to the upstream portion; anyway, the rod should be placed so as to achieve optimum temperature distribution through the catalyst 51.

The present embodiment has used a metallic rod as heat conducting means. But a heat conducting means of any suitable shape may be used. For example, a metallic mesh or the like can be used as long as it is constructed to conduct the cooling effect in the downstream portion through to the middle portion. Also, the material need not be limited to a metal, but other material, for example, a high heat conducting ceramic material such as silicon carbide, can be used.

Further, in the present embodiment, cooling water is used for cooling the downstream portion of the catalyst, but instead, the water may be vaporized and supplied as steam. In this case, since the steam temperature is close to the temperature of the catalyst 51, the temperature variation of the catalyst 51 does not increase even when the cooling water vaporizing plate 60 is omitted. Furthermore, since the steam is directly sprayed over the downstream portion of the catalyst 51, equilibrium of the shift reaction becomes easier to reach, and the carbon monoxide concentration can thus be reduced.

Embodiment 3-4

An embodiment 3-4 of the present invention will be described.

Figure 10:
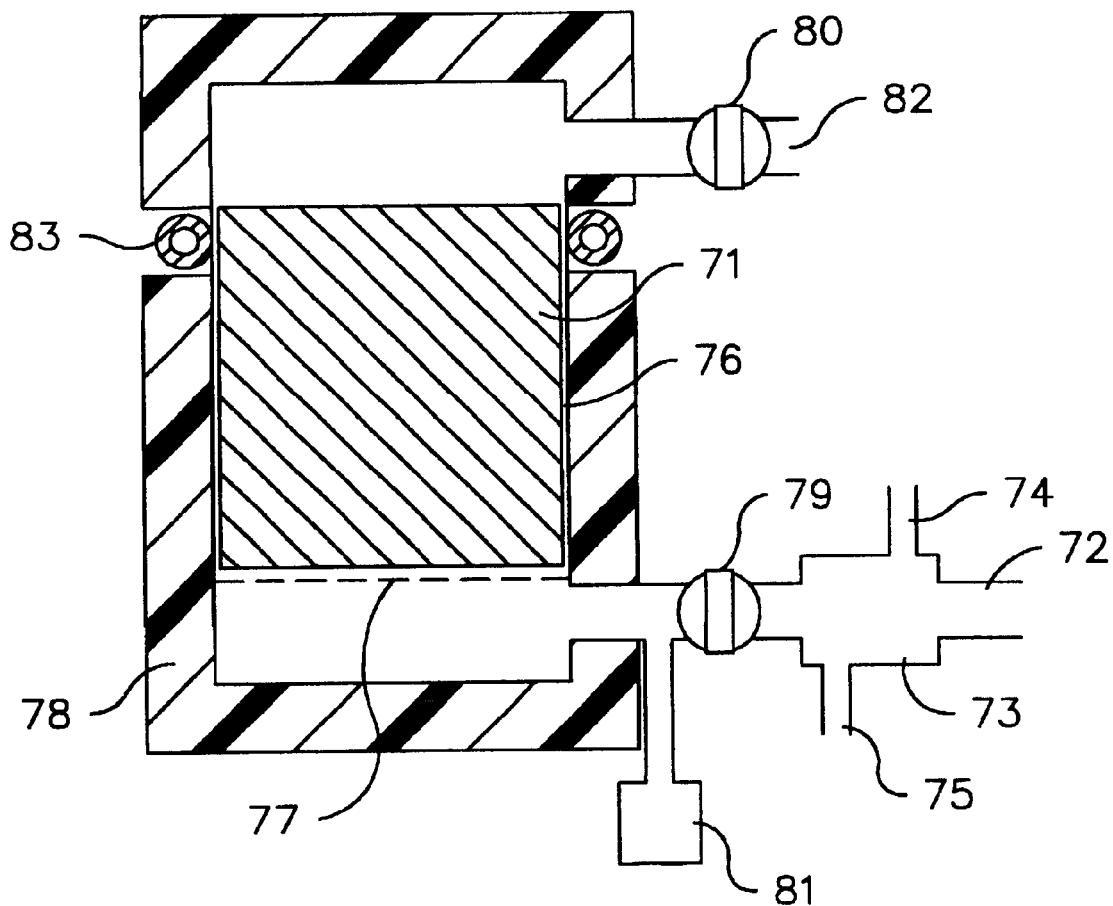
FIG. 10 is a diagrammatic cross sectional view showing the construction of a hydrogen generating apparatus according to an embodiment 3-4 of the present invention.

FIG. 10 is a diagrammatic cross sectional view of a hydrogen generating apparatus according to the embodiment 3-4 of the present invention. The hydrogen generating apparatus shown in FIG. 10 comprises a catalyst 71, a reformed gas inlet 72, a heat exchanger 73, a cooling air inlet 74, a cooing air outlet 75, a reaction chamber 76, a catalyst supporting net 77, an insulator 78, an inlet shut-off valve 79, an outlet shut-off valve 80, a pressure controller 81, a reformed gas outlet 82, and a cooling water capillary 83. The catalyst 71 used here consists of a catalyst material supported on a honeycomb.

Next, the operation and characteristic of the hydrogen generating apparatus according to the present embodiment will be described. Usually, a copper-based catalyst is used for the shift catalyst. This catalyst has activity in a reducing atmosphere within a reformed gas composed principally of hydrogen, and is easily oxidized when brought into contact with oxygen. Once the catalyst is oxidized, the activity thereof cannot be restored fully even if activation treatment is applied to the catalyst in the reducing atmosphere. This will not immediately lead to a serious problem after several cycles of oxidation-reduction, but in order to maintain a long-term stable characteristic, it is necessary not to oxidize the catalyst. Further, the influence of oxygen mixing becomes greater as the amount of the catalyst used decreases, that is, as the apparatus becomes smaller and more sophisticated. Usually, during steady state operation of the apparatus, there is no possibility of oxygen mixing, but when the operation of the apparatus is stopped, oxygen mixing is most likely to occur.

In the present embodiment, the inlet shut-off valve 79 and outlet shut-off valve 80, installed at the inlet and outlet of the reaction chamber 76 where the catalyst 71 is contained, prevent oxygen from entering from the outside. Further, when the operation of the apparatus is stopped, the temperature drops and the steam condenses and, as a result, the pressure inside the reaction chamber drops, at which time oxygen mixing is likely to occur. At this time, the pressure controller 81 works to maintain the pressure inside the reaction chamber 76 at a level approximately equal to or slightly higher than the outside pressure, thus completely preventing oxygen from entering. In this way, deterioration of the catalyst is prevented for extended periods of time, and stable performance can thus be maintained.

In the present embodiment, shut-off valves are provided on both the upstream and downstream sides of the reaction chamber 76, but depending on the construction of the apparatus, the shut-off valve may be provided only on the downstream side or on the upstream side to shut off the passage through which oxygen is likely to enter. Further, a shut-off valve may also be provided at the inlet to the reformer to also shut off the reformer from the outside.

Embodiment 3-5

Figure 11:
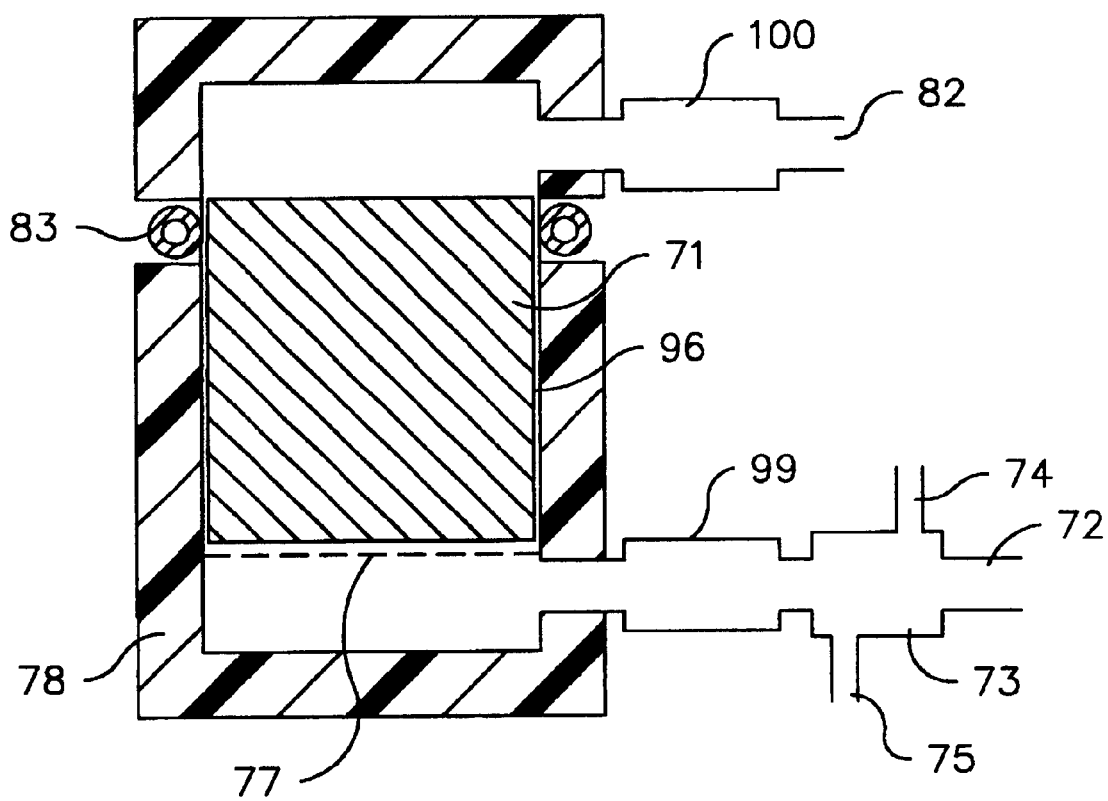
FIG. 11 is a diagrammatic cross sectional view showing the construction of a hydrogen generating apparatus according to an embodiment 3-5 of the present invention.

An embodiment 3-5 of the present invention will be described. In this embodiment, as shown in FIG. 11, an inlet oxidation inhibitor 99 and an outlet oxidation inhibitor 100 are provided at the inlet and outlet of the reaction chamber 96. Most of the operation and effect of this embodiment is similar to that of the embodiment 3-4. The following description, therefore, focuses on differences.

FIG. 11 is a diagrammatic cross sectional view of the hydrogen generating apparatus according to the present embodiment. The inlet oxidation inhibitor 99 and outlet oxidation inhibitor 100 provided at the inlet and outlet of the reaction chamber 96 prevent oxygen from entering through the respective passages when the operation of the apparatus is stopped. The oxidation inhibitors provided at the inlet and outlet are deoxidized during normal operation by the hydrogen contained in the reformed gas, and are always in the regenerated condition when the operation of the apparatus is stopped; therefore, they do not need replacement and can be used for long periods of time. Any material that is oxidized at room temperature, and that is deoxidized in the reformed gas, can be used for the oxidation inhibitors: a metal, such as copper, worked in fine fibrous form, and metallic particles supported on alumina, zeolite, etc. are examples of such materials.

The third embodiment described above has dealt with a hydrogen generating apparatus that uses natural gas reformed gas, but the present invention is not limited to this particular one. That is, the invention is also intended to embrace the following variations.

In the third embodiment, other gaseous hydrocarbon fuels, such as propane and butane, or liquid hydrocarbon fuels, such as gasoline and kerosene, can be used.

For the catalyst, a copper-based material supported on alumina has been used as the catalyst, but any material that can cause the shift reaction of carbon monoxide can be used, for example, a catalyst formed from a composite of other transition metals, a catalyst formed from a noble metal such as platinum, palladium, rhodium, or ruthenium, or a catalyst formed from a composite of such noble metals.

Further, the catalyst has been described as being shaped in pellet form or honeycomb form. But any other shape may be employed as long as the catalyst has such a shape as to allow efficient contact between the reformed gas and the catalyst and not cause appreciable pressure losses. For example, the catalyst may be formed from a catalyst material supported on a heat resisting fabric or from a corrugated metallic base.

Specific examples relating to the third embodiment of the present invention will be described below.

EXAMPLE 1

Alumina on which copper was supported was molded into pellet form to fabricate the catalyst 31. This catalyst 31 was placed in the reaction chamber 36 of the hydrogen generating apparatus shown in FIG. 6. Reformed gas, consisting of 8% carbon monoxide, 8% carbon dioxide, and 20% steam, with hydrogen accounting for the remaining percentage, was introduced into the reaction chamber 36 at a flow rate of 10 liters per minute through the reformed gas inlet 32. The reformed gas thus introduced was controlled at 300° C. by the cooling effect of the heat exchanger 33 and caused to react over the catalyst 31.

The downstream end of the catalyst 31 was cooled by the cooling water capillary 39; when the temperature distribution in the catalyst 31 was measured, it was shown that the temperature dropped almost linearly over the region from the upstream to the downstream portion. When the temperature of the downstream end of the catalyst 31 was controlled at 140° C., 150° C., and 160° C., respectively, and the composition of the reformed gas released through the reformed gas outlet 40 after being passed over the catalyst 31 was measured using a gas chromatograph, the carbon monoxide concentration was 3200 ppm, 3000 ppm, and 3100 ppm, respectively.

EXAMPLE 2

The catalyst fabricated in the first example was placed in the reaction chamber 46 shown in FIG. 8, and the reformed gas was introduced through the reformed gas inlet 42 at a flow rate of 10 liters per minute. When the reformed gas temperature after passing through the heat exchanger 43 was controlled at 300° C., as in the first example, and water was supplied through the cooling water supply pipe 49 at a rate of 0.5 liter per minute, the temperature measured at the downstream end of the catalyst 41 was 150° C. The carbon monoxide concentration measured at this time was 2000 ppm.

EXAMPLE 3

The catalyst fabricated in the first example was placed in the reaction chamber 56 shown in FIG. 9, and the reformed gas was introduced through the reformed gas inlet 52 at a flow rate of 10 liters per minute. When the reformed gas temperature after passing through the heat exchanger 53 was controlled at 300° C., as in the first example, and water was supplied through the cooling water supply pipe 59 at a rate of 0.5 liter per minute, the temperature measured at the downstream end of the catalyst 51 was 150° C. The carbon monoxide concentration measured at this time was 2200 ppm.

EXAMPLE 4

The construction shown in FIG. 10 was used in this example. Alumina on which copper was supported was applied over a cordierite honeycomb to fabricate the catalyst 71. This catalyst 71 was placed in the reaction chamber 76 of the hydrogen generating apparatus shown in FIG. 10. And reformed gas containing 8% carbon monoxide, 8% carbon dioxide, and 20% steam, with hydrogen accounting for the remaining percentage, was introduced through the reformed gas inlet 72 at a flow rate of 10 liters per minute. The reformed gas thus introduced was controlled at 300° C. by the cooling effect of the heat exchanger 73 and caused to react over the catalyst 71. The temperature of the downstream end of the catalyst 71 was controlled at 150° C. using the cooling water capillary 83. When the composition of the reformed gas released through the reformed gas outlet 82 after being passed over the catalyst 71 was measured using a gas chromatograph, the carbon monoxide concentration was 1500 ppm. After that, the operation stop/start cycle was repeated 200 times. When the operation was stopped, the inlet shutoff valve 79 and outlet shut-off valve 80 was closed, and the inside pressure was maintained 5% higher than the outside pressure by means of the pressure controller 81. The apparatus was operated again, and the carbon monoxide concentration after the catalyst 71 was measured under the same conditions as above; the result showed 1530 ppm.

EXAMPLE 5

The catalyst fabricated in the fourth example was placed in the reaction chamber 96 shown in FIG. 11. Metallic copper fibers of 0.2 mm diameter as the inlet oxidation inhibitor 99 and outlet oxidation inhibitor 100 were filled into the inlet and outlet of the reaction chamber 96. The reformed gas was introduced through the reformed gas inlet 92 at a flow rate of 10 liters per minute. The reformed gas thus introduced was controlled at 300° C. by the cooling effect of the heat exchanger 93 and caused to react over the catalyst 91. The temperature of the downstream end of the catalyst 91 was controlled at 150° C. using the cooling water capillary 102. When the composition of the reformed gas released through the reformed gas outlet 101 after being passed over the catalyst 91 was measured using a gas chromatograph, the carbon monoxide concentration was 1500 ppm. After that, the operation stop/start cycle was repeated 200 times. The apparatus was operated again, and the carbon monoxide concentration after the catalyst 91 was measured under the same conditions as above; the result showed 1550 ppm.

COMPARATIVE EXAMPLE 1

The cooling water capillary 39 in the first example was removed so that it would not be used for cooling, and the reformed gas was supplied with the temperature controlled at 300° C. by the cooling effect of the heat exchanger 33. The highest temperature measured at the downstream portion of the catalyst 31 was 400° C., exceeding the highest temperature that the catalyst could withstand. When the composition of the reformed gas released through the reformed gas outlet 40 after being passed over the catalyst 31 was measured using a gas chromatograph, the carbon monoxide concentration was 20000 ppm.

COMPARATIVE EXAMPLE 2

The cooling water capillary 39 in the first example was removed so that it would not be used for cooling, and the reformed gas was supplied with the temperature controlled at 190° C. by the cooling effect of the heat exchanger 33. The highest temperature measured at the downstream portion of the catalyst 31 was 300° C. When the composition of the reformed gas released through the reformed gas outlet 40 after being passed over the catalyst 31 was measured using a gas chromatograph, the carbon monoxide concentration was 8000 ppm.

COMPARATIVE EXAMPLE 3

The catalyst fabricated in the fourth example was placed in the reaction chamber 76 shown in FIG. 10. The reformed gas was introduced through the reformed gas inlet 72 at a flow rate of 10 liters per minute. The reformed gas thus introduced was controlled at 300° C. by the cooling effect of the heat exchanger 73 and caused to react over the catalyst 71. The temperature of the downstream end of the catalyst 71 was controlled at 150° C. using the cooling water capillary 83. When the composition of the reformed gas released through the reformed gas outlet 82 after being passed over the catalyst 71 was measured using a gas chromatograph, the carbon monoxide concentration was 1500 ppm. After that, the operation stop/start cycle was repeated 50 times. The apparatus was operated again, and the carbon monoxide concentration after the catalyst 71 was measured under the same conditions as above; the result showed 7000 ppm.

According to the third embodiment of the present invention, as is apparent from the evaluation results compared between the examples and the comparative examples, a hydrogen generating apparatus can be provided that exhibits high performance using a shift reactor with a small volume. Also, the apparatus shows stable operation for long periods of time by eliminating the effects of oxygen mixing that occurs when the apparatus stop/start operation is repeated.

What is claimed is:

1. A method for operating a hydrogen generating apparatus, wherein the hydrogen generating apparatus comprises: a reformer including a reforming catalyst layer for generating from a fuel a reformed gas containing at least hydrogen; a heating section for heating said reforming catalyst layer; a fuel supply section for supplying said fuel to said reformer and said heating section; a water supply section for supplying water to said reformer; a shift reactor including a shift catalyst layer for shifting carbon monoxide in said reformed gas to carbon dioxide by causing said reformed gas to react with water; and a temperature detector for detecting the temperature of a downstream portion of said shift catalyst layer, said method comprising the steps of:

raising the temperature of the downstream portion of said shift catalyst layer to a higher temperature than the temperature of the same before the supply of said reformed gas to said shift reactor is increased, and lowering the temperature of the downstream portion of said shift catalyst layer to a lower temperature than the temperature of the same before the supply of said reformed gas to said shift reactor is decreased.

2. The method for operating the hydrogen generating apparatus in accordance with claim 1 further comprising a step of cooling said shift catalyst layer by passing through a first heat exchanger, which is installed at a location downstream from said shift catalyst layer, at least one medium selected from the group consisting of fuel and water to be supplied to said reformer and air and fuel to be supplied to said heating section.

3. The method for operating the hydrogen generating apparatus in accordance with claim 1, further comprising the steps of:

supplying water from said water supply section also to a first water vaporizer installed between said fuel supply section and said reformer, and a second water installed between said reformer and said shift reactor, supplying steam generated from said first vaporizer to said reformer, supplying steam generated from said second vaporizer to said shift reactor, regulating an amount of water supply to said second vaporizer to control the temperature of said shift reactor, and controlling proportions of water supply to said first and said second vaporizer to maintain the amount of water supply to said reformer and said shift reactor constant.

4. The method for operating the hydrogen generating apparatus in accordance with claim 1, further comprising a step of preventing oxidation of said shift catalyst by an oxidation preventing means, which is installed on the upstream and/or downstream side of said shift catalyst layer.

5. The method for operating the hydrogen generating apparatus in accordance with claim 4, further comprising a step of shutting off a passage between said reformer and said shift reactor and/or a passage between said shift reactor and said purifier by said oxidation preventing means.

6. The method for operating the hydrogen generating apparatus in accordance with claim 4, wherein said oxidation preventing means comprises a metal oxide, which is reducible in said reformed gas and supported on a carrier of a honeycomb structure, a foamed structure having communicating pores or a mesh structure, or comprises fiber of said oxide.

* * * * *

UNITED STATES PATENT AND TRADEMARK OFFICE
CERTIFICATE OF CORRECTION

PATENT NO. : 6,562,088 B2
DATED : May 13, 2003
INVENTOR(S) : Kunihiro Ukai et al.

It is certified that error appears in the above-identified patent and that said Letters Patent is hereby corrected as shown below:

Column 22,
Line 33, "second water" should read -- second water vaporizer --;
Line 34, a new paragraph should start with the word "supplying".

Signed and Sealed this

Thirtieth Day of September, 2003

JAMES E. ROGAN
*Director of the United States Patent and Trademark Office*